Aug. 21, 1923.
H. F. ANDERSON
1,465,507
METHOD AND MACHINE FOR CONSTRUCTING EMBOSSED GLASS PLATE
Filed Oct. 3, 1921   2 Sheets-Sheet 2
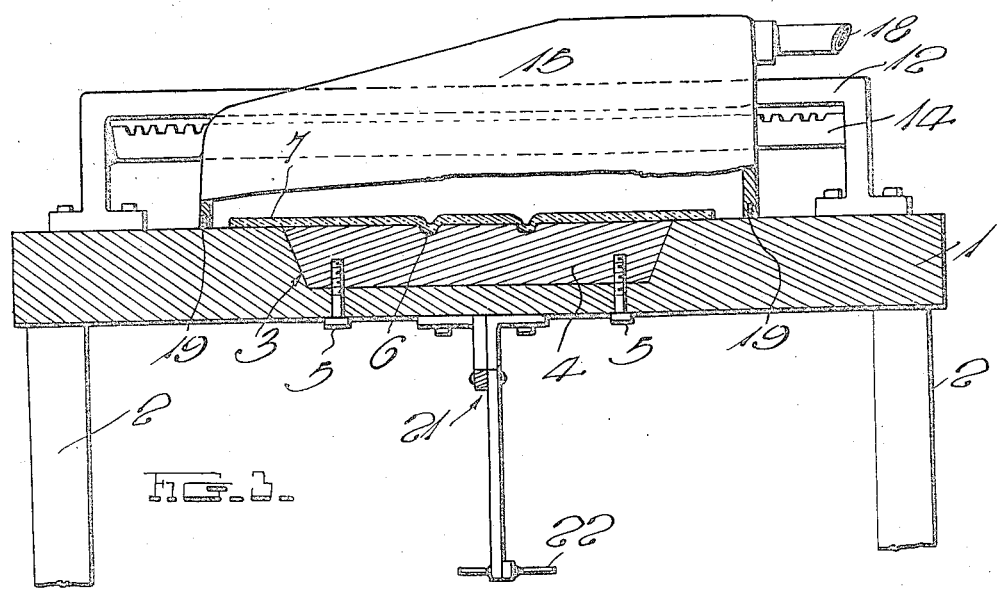
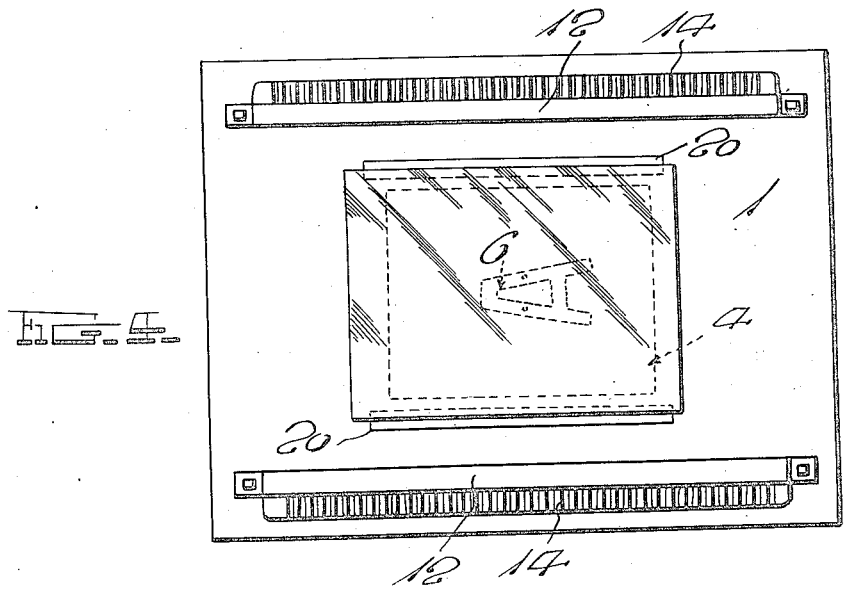
Inventor
H. F. ANDERSON
Witness
H. Woodard Patented Aug. 21, 1923.

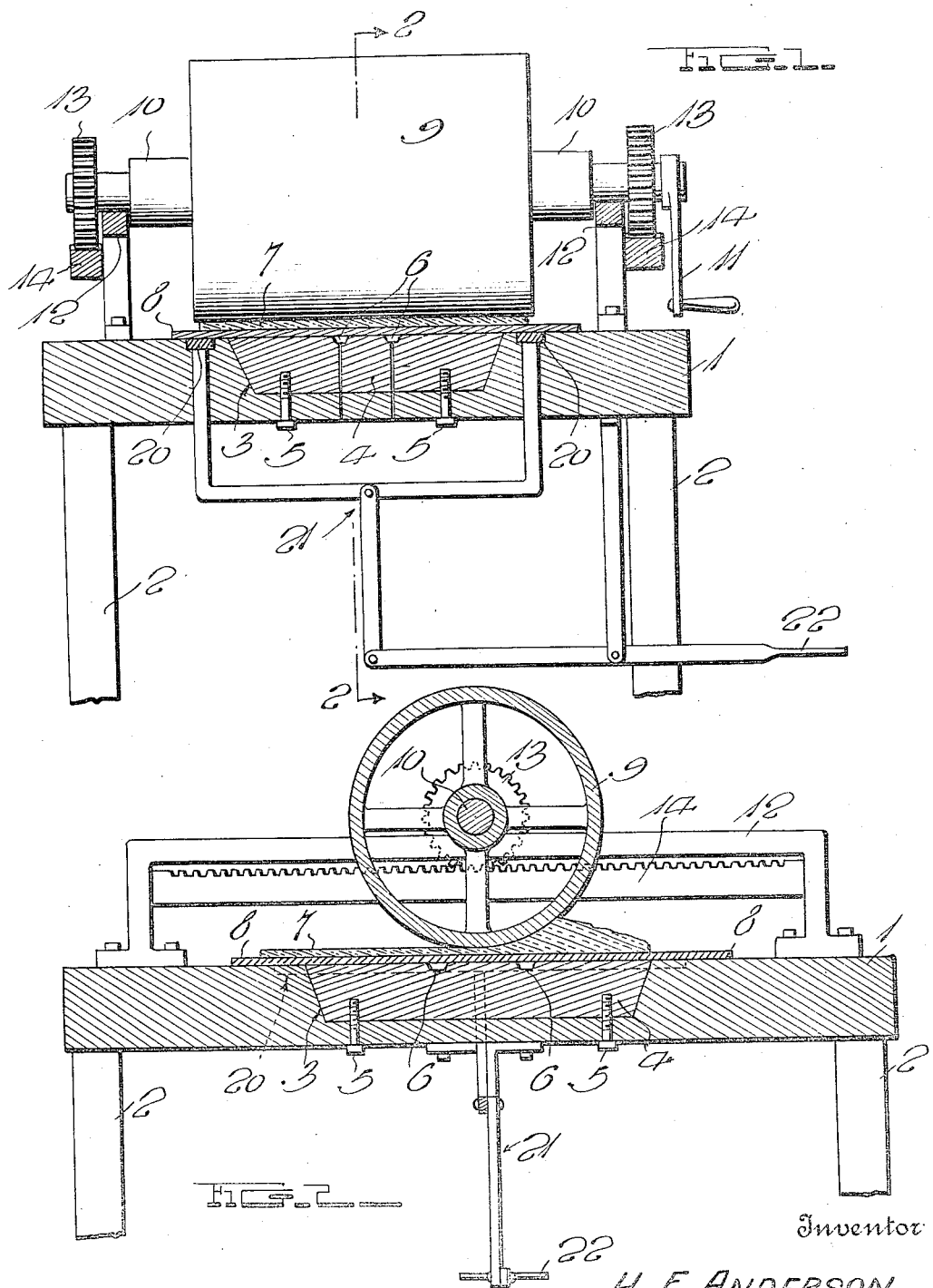

1,465,507

UNITED STATES PATENT OFFICE.

HARRY F. ANDERSON, OF MARION, INDIANA.

METHOD AND MACHINE FOR CONSTRUCTING EMBOSSED GLASS PLATE.

Application filed October 3, 1921. Serial No. 505,066.

*To all whom it may concern:*

Be it known that I, HARRY F. ANDERSON, a citizen of the United States, residing at Marion, in the county of Grant and State of Indiana, have invented certain new and useful Improvements in Methods and Machines for Constructing Embossed Glass Plate; and I do declare the following to be a full, clear, and exact description of the invention, such as will enable others skilled in the art to which it appertains to make and use the same.

My invention relates to the embossing of glass plates and more particularly to the formation of letters thereon, although the invention is applicable in embossing numerous characters, designs and the like.

The object of the invention is to provide a simple and effective method and apparatus for forming an embossed sheet of glass whereby the soft glass stock can be formed into a sheet upon a pallet resting directly upon the working face if a die and the pallet then withdrawn from beneath the glass to allow the glass sheet to settle upon the die without cooling beyond a workable degree and a hood then immediately put in place and air under pressure admitted to the hood to cause the workable glass to be molded into the desired shape by the die.

With the foregoing in view, the invention resides in the novel subject matter hereinafter described and claimed, the descriptive matter being supplemented by the accompanying drawings.

Figure 1 is a transverse sectional view of a glass rolling machine, showing the manner of rolling the sheet of glass upon the pallet.

Figure 2 is a longitudinal sectional view as indicated by line 2—2 of Fig. 1.

Figure 3 is a longitudinal sectional view partly in elevation, showing the manner in which the warm glass sheet is embossed by means of a hood containing fluid under pressure and a die or mold.

Figure 4 is a top plan view on a reduced scale showing the embossed sheet resting on the table of the glass rolling machine.

In the drawings above briefly described, the numeral 1 designates a horizontal table supported upon suitable legs or the like 2, the upper side of said table being here shown with a recess 3 in which a mold or die plate 4 is detachably secured by means of screws or the like 5. In the present showing, the upper surface of the die plate 4 is formed with a recess 6 into which the glass is to be forced by compressed air or other fluid pressure. The recess 6 is of a shape corresponding to the letter of other character or design which is to be formed on the sheet of glass 7 and this recess is covered by a pallet 8 as shown in Figs. 1 and 2 when the sheet is being rolled. This rolling process may be effected in any suitable manner, but I have shown a roller 9 mounted on a shaft 10 for this purpose, said shaft having a suitable handle 11. A portion of the shaft 10 rolls upon a pair of longitudinal tracks 12 mounted on the table 1 and to prevent canting of said shaft, its ends are preferably provided with spur gears 13 which mesh with suitable rack bars 14 extending longitudinally of the table.

After the glass has been rolled upon the pallet one operator will hold one end of the sheet with a gripping device and another operator will grasp the opposite end of the pallet with suitable gripping means and draw the pallet from beneath the sheet of glass and when the pallet is removed the sheet of glass will settle upon the upper face of the die and therefore will not be permitted to cool beyond a workable degree before it reaches the die. The hood 15 will now be immediately put in place over the sheet 7 and warm compressed air or other fluid pressure is forced into said hood through a suitable inlet 18, the result being that the pressure of the air forces the hot glass into the recess 6 so that a character is formed on said sheet, of exactly the same shape as said recess. Any suitable means 19 may be employed for establishing a fluid tight contact between the hood 15 and the table 1 and if desired, suitable means may be used for clamping said hood down against possible upward blowing under the air pressure.

For raising the pallet 8 and the sheet of glass 7 while removing the former, suitable ejecting bars 20 are provided, said bars being operable through the instrumentality of any desired means 21 which is by preference equipped with a foot pedal 22. The ejectors 20 are also instrumental in raising the embossed plate 7 from the table when it is to be removed.

From the foregoing taken in connection with the accompanying drawings, it will be seen that I have devised an extremely simple, yet efficient machine and method for embossing glass plates, and it will be understood that by changing the mold or die plate 4 as required, any desired characters or designs may be impressed upon the glass.

Since excellent results are obtained from the subject matter disclosed, it may well be followed, but it is to be understood that within the scope of the invention as claimed, numerous changes may be made.

I claim:

1. The herein described method of forming an embossed sheet of glass consisting in placing a pallet upon a die, forming soft glass into a thin sheet upon said pallet, drawing said pallet from beneath the sheet of hot glass to allow the sheet of glass to settle upon the die while still hot and in a workable condition, immediately placing a hood over the sheet of glass, and forcing fluid under pressure into said hood to cause the sheet to conform in shape to the die.

2. In an apparatus for forming embossed sheets of glass, the combination of a die, glass rolling means above said die, a removable pallet resting upon said die beneath said rolling means and readily removable from between said die and a sheet of glass formed upon the pallet by a sliding movement to permit the sheet of glass to settle upon the die while hot and in a workable condition and a hood movable into position over the sheet of glass and die and having an inlet for fluid under pressure.

In testimony whereof I have hereunto set my hand.

HARRY F. ANDERSON.